(12) United States Patent
Choi et al.

(10) Patent No.: US 11,468,887 B2
(45) Date of Patent: Oct. 11, 2022

(54) ELECTRONIC DEVICE AND CONTROL METHOD THEREOF

(71) Applicant: Samsung Electronics Co., Ltd., Suwon-si (KR)

(72) Inventors: Songah Choi, Suwon-si (KR); Youngjong Boo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 191 days.

(21) Appl. No.: 16/566,021

(22) Filed: Sep. 10, 2019

(65) Prior Publication Data

US 2020/0098364 A1 Mar. 26, 2020

(30) Foreign Application Priority Data

Sep. 21, 2018 (KR) .................. 10-2018-0113869

(51) Int. Cl.
*G10L 15/22* (2006.01)
*G10L 15/08* (2006.01)
*G06F 3/16* (2006.01)

(52) U.S. Cl.
CPC .............. *G10L 15/22* (2013.01); *G06F 3/167* (2013.01); *G10L 15/08* (2013.01); *G10L 2015/088* (2013.01); *G10L 2015/223* (2013.01)

(58) Field of Classification Search
CPC ....... G10L 15/22; G10L 15/00; G10L 15/063; G10L 15/08; G10L 15/18; G10L 15/24; G10L 15/26; G10L 2015/22; G10L 2015/0631–0638; G10L 2015/221–228
USPC ................ 704/231, 236, 245, 251, 255, 257
See application file for complete search history.

(56) References Cited

U.S. PATENT DOCUMENTS

| | | | |
|---|---|---|---|
| 9,620,109 B2 | 4/2017 | Song et al. | |
| 9,990,923 B2 | 6/2018 | Li et al. | |
| 10,043,520 B2 | 8/2018 | Mun et al. | |
| 2015/0052169 A1* | 2/2015 | Ojima | H04N 21/47217 707/769 |
| 2015/0127675 A1 | 5/2015 | Kim et al. | |
| 2015/0324334 A1* | 11/2015 | Lee | G06F 40/134 715/208 |
| 2016/0328206 A1* | 11/2016 | Nakaoka | G06F 16/9566 |
| 2016/0350304 A1 | 12/2016 | Aggarwal et al. | |
| 2017/0339088 A1 | 11/2017 | Judd et al. | |

(Continued)

FOREIGN PATENT DOCUMENTS

| | | | |
|---|---|---|---|
| JP | 5638210 B2 | 12/2014 | |
| KR | 10-2013-0094577 A | 8/2013 | |

(Continued)

OTHER PUBLICATIONS

International Search Report dated Dec. 23, 2019 in corresponding Korean Patent Application PCT/KR2019/011326.

(Continued)

*Primary Examiner* — Qi Han
(74) *Attorney, Agent, or Firm* — Staas & Halsey LLP

(57) ABSTRACT

An electronic device includes a storage, and a processor to identify a category corresponding to a keyword related to a content of an output screen, to obtain use history of at least one application corresponding to the identified category, and to provide, based on the use history, guide information to guide a user to select one of the at least one application for execution by the electronic device.

18 Claims, 9 Drawing Sheets

(56) References Cited

U.S. PATENT DOCUMENTS

2017/0352350 A1    12/2017  Booker et al.
2018/0101855 A1*   4/2018   Deluca .................. G06Q 50/01
2020/0013401 A1    1/2020   Saito et al.

FOREIGN PATENT DOCUMENTS

| KR | 10-2015-0100322 A | 9/2015 |
| KR | 10-2016-0006464 A | 1/2016 |
| KR | 10-2016-0039830 A | 4/2016 |
| KR | 10-2017-0029667 A | 3/2017 |
| KR | 10-2018-0000711 A | 1/2018 |
| WO | WO 2018/155026 A1 | 8/2018 |

OTHER PUBLICATIONS

Written Opinion of the International Searching Authority dated Dec. 23, 2019 in corresponding Korean Patent Application PCT/KR2019/011326.
Extended European Search Report dated Jul. 23, 2021 in corresponding European Application 19863208.5-1203.

* cited by examiner

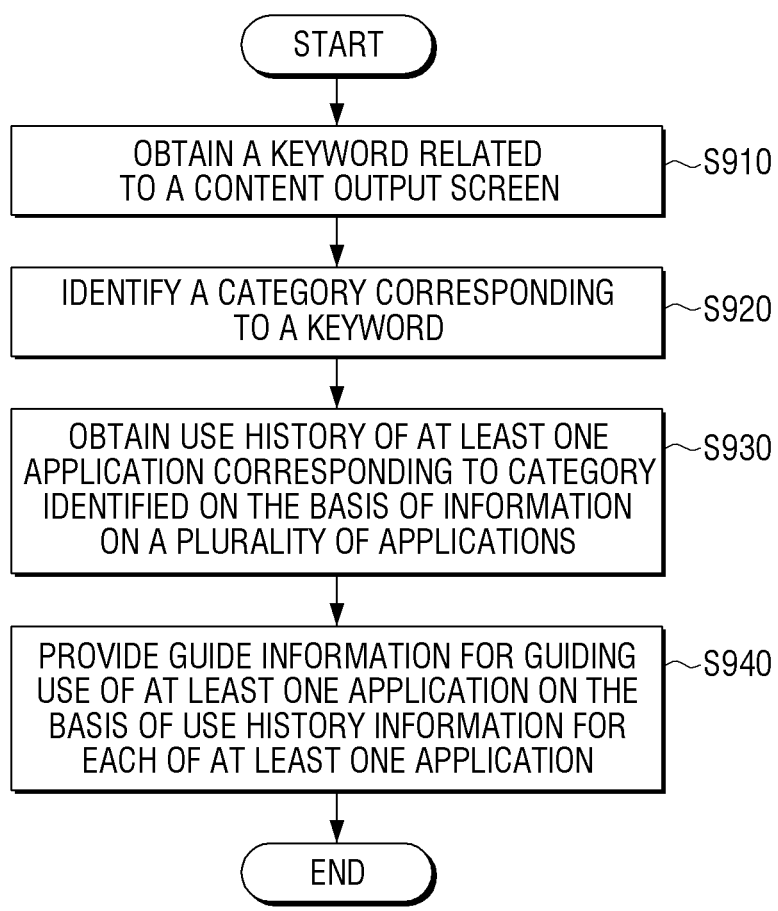

ELECTRONIC DEVICE AND CONTROL METHOD THEREOF

CROSS-REFERENCE TO RELATED APPLICATIONS

This application is based on and claims priority under 35 U.S.C. § 119 to Korean Patent Application No. 10-2018-0113869, filed on Sep. 21, 2018, in the Korean Intellectual Property Office, the disclosure of which are incorporated by reference herein in it's entirety.

BACKGROUND

Field

The disclosure relates to an electronic device and a control method thereof, and more particularly to, an electronic device for receiving a user voice and a control method thereof.

Description of Related Art

Development in electronic technology has led to development and distribution of various types of electronic devices.

In particular, an intuitive operation of a user is available as various types of electronic devices controlled based on a user voice have been developed, and convenience of the user has been increased.

The related-art electronic device has a slightly unsatisfactory voice recognition performance to correctly recognize a voice command of a user and perform a function corresponding to the voice command.

In order to overcome the foregoing, some electronic devices display a representative utterance example that guides as to which word the user's utterance should include and which sentence form the user's utterance needs to have.

The representative utterance example is not related to a current situation or a content which is being output, and thus, there is a problem of inducing a user to generate a wrong utterance.

Therefore, there is a need to provide guide information for guiding so that a user may understand more intuitively, and make the utterance correctly.

The related-art electronic device only provides guide information for controlling the function of the electronic device itself through a voice command.

The electronic device needs to provide a user with guide information capable of controlling functions of an external electronic device used by a user and a function of an electronic device itself, through a voice command.

SUMMARY

Exemplary embodiments of the present disclosure overcome the above disadvantages and other disadvantages not described above. Also, the present disclosure is not required to overcome the disadvantages described above, and an embodiment may not overcome any of the problems described above.

The object of the disclosure is to provide an electronic device providing guide information based on a use history and a control method thereof.

According to an embodiment, an electronic device includes a storage, and a processor to identify a category corresponding to a keyword related to a content of an output screen, obtain use history of at least one application corresponding to the identified category based on information on a plurality of applications included in the storage, and provide, based on the use history, guide information for guiding a use to select one of the at least one application for execution by the electronic device.

The processor may identify an application related to the keyword based on use history information of each of the at least one application, and provide guide information for guiding the user to select the identified application.

The processor may identify an application based on at least one of a number of uses and use timing for each of the at least one application, and provide guide information for guiding the user to select the identified application.

The processor may provide guide information for guiding use of the identified application related to the keyword.

The processor may identify a plurality of keywords corresponding to the identified category, and based on utterance information including at least one of the plurality of keywords being identified from among user's utterance history, provide guide information for guiding use of the identified utterance information.

The processor may provide guide information for guiding use of the utterance information based on a user's selection history for response information provided based on the identified utterance information, or provide guide information for guiding the user to select utterance information of another user.

The electronic device may further include a communication interface, and the processor may receive information on the plurality of applications from an external device through the communication interface, and based on a selection command for an application included in the guide information being input, provide a control command for executing the selected application to the external device.

The processor may, based on a user voice related to at least one of the plurality of applications being received, store the user voice as use history information for the application.

The guide information may be information for guiding a voice command of a user.

The electronic device may further include a display, and the processor may control the display to display the content output screen and the guide information.

The electronic device may further include a speaker, and the processor may obtain the keyword based on sound which is being output through the speaker.

According to an embodiment, a control method of an electronic device includes identifying a category corresponding to a keyword related to a content of an output screen, obtaining a use history of at least one application corresponding to the identified category based on information on a plurality of applications, and providing, based on the use history, guide information for guiding a user to select one of the at least one application for execution by the electronic device.

The providing the guide information may include identifying an application related to the keyword based on use history information of each of the at least one application, and providing guide information for guiding the user to select the identified application.

The providing the guide information may include identifying an application based on at least one of a number of uses and use timing for each of the at least one application, and providing guide information for guiding the user to select the identified application.

The providing the guide information may include providing guide information for guiding use of the identified application related to the keyword.

The method may include identifying a plurality of keywords corresponding to the identified category, and based on utterance information including at least one of the plurality of key words being identified from among the user's utterance history, providing guide information for guiding use of the identified utterance information.

The method may include providing guide information for guiding use of the utterance information based on a user's selection history for response information provided based on the identified utterance information, or providing guide information for guiding the user to select utterance information of another user.

The method may include receiving information on the plurality of applications from an external device, and based on a selection command for an application included in the guide information being selected, providing a control command for executing the selected application to the external device.

The method may include, based on a user voice related to at least one of the plurality of applications being received, storing the user voice as use history information for the application.

The guide information may be information for guiding a voice command of a user.

According to various embodiments, a user may be provided with guide information related to a content output screen, and convenience of a user in controlling an electronic device or an external device may be improved.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 9 is a flowchart provided to describe a control method of an electronic device according to an embodiment.

DETAILED DESCRIPTION

Figure 1:
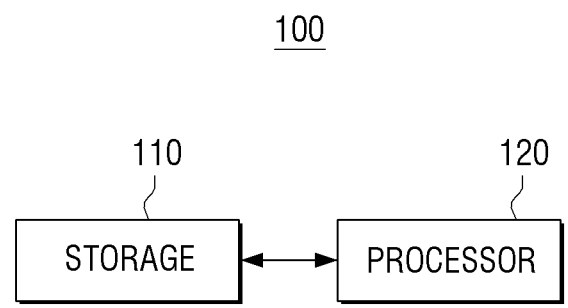
FIG. 1 is a block diagram illustrating a configuration of an electronic device according to an embodiment.

After terms used in the present specification are briefly described, the present disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

Since the disclosure may be variously modified and have several embodiments, specific embodiments of the disclosure will be illustrated in the drawings and be described in detail in the detailed description. However, it is to be understood that the disclosure is not limited to specific exemplary embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by the terms. The terms are used only to distinguish one component from another component.

Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In exemplary embodiments of the present disclosure, a 'module' or a '~er/~or' may perform at least one function or operation, and be implemented by hardware or software or be implemented by a combination of hardware and software. In addition, a plurality of 'modules' or a plurality of '~ers/~ors' may be integrated in at least one module and be implemented by at least one processor (not illustrated) except for a 'module' or a '~er/or' that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted to obviously describe the disclosure, and similar portions will be denoted by similar reference numerals throughout the specification.

FIG. 1 is a block diagram illustrating a configuration of an electronic device 100 according to an embodiment.

Figure 2:
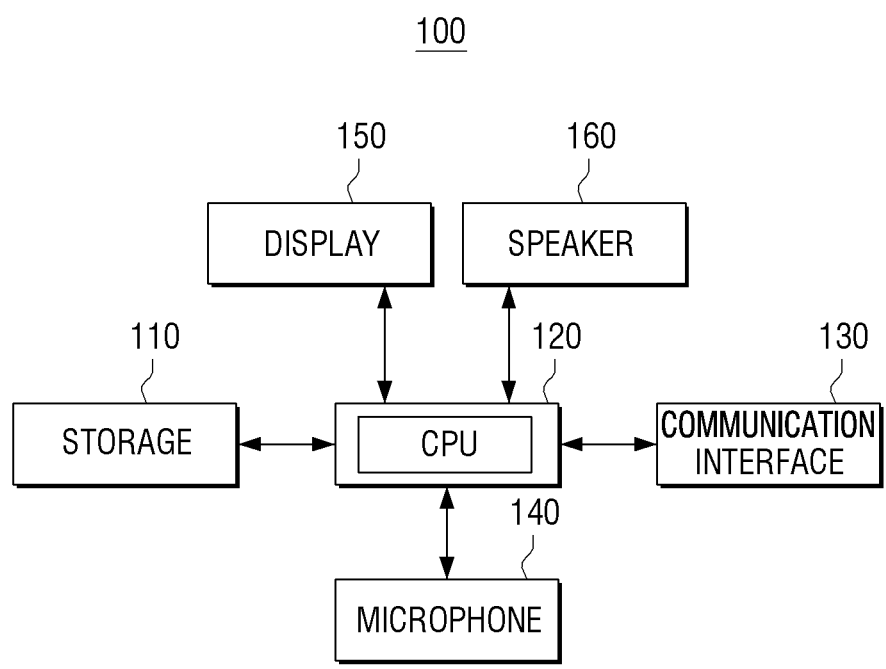
FIG. 2 is a block diagram illustrating a detailed configuration of an electronic device illustrated in FIG. 1.

As illustrated in FIG. 2, the electronic device 100 may be implemented as a display device but is not limited thereto, and may be implemented as various types of electronic devices 100 that output a content. For example, the electronic device 100 may be implemented as various types of source devices that provide a content to a display device, such as a blue ray player, a digital versatile disc (DVD) player, a streaming content output device, a set-top box, or the like. The electronic device 100 may output content through a display provided in the electronic device 100 or provide another electronic device with the content.

The electronic device 100 may be implemented as an apparatus having a display function, such as a TV, a smartphone, a tablet PC, a portable multimedia player (PMP), a personal digital assistant (PDA), a notebook computer, a smart watch, a head mounted display (HMD), a near eye display (NED), or the like. The electronic device 100 may be implemented to include a display of various types to provide a display function, such as a liquid crystal display (LCD), an organic light-emitting diode (OLED), a liquid crystal on silicon (LCoS), a digital light processing (DLP), a micro LED, a quantum dot (QD) display panel, and the like.

The electronic device 100 may be implemented as various types of home appliances such as a speaker, a refrigerator, an air conditioner, an air purifier, Internet of things, or the like.

Referring to FIG. 1, the electronic device 100 includes a storage 110 and a processor 120.

The storage 110 stores an operating system (O/S) software module to drive the electronic device 100 and various data such as various multimedia contents.

The processor 120 may be implemented with a digital signal processor (DSP), a microprocessor, and a time controller (TCON) which process a digital image signal, but this is not limited thereto. The processor 120 may include one or more among a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 120 may be implemented in a system on chip (SoC) type or a large scale integration (LSI) type which a processing algorithm is built therein or in a field programmable gate array (FPGA) type.

In particular, the processor 120 may obtain a keyword related to a content output screen. For example, when the electronic device 100 outputs a content through a display provided in the electronic device 100, the processor 120 may obtain a keyword from the content output screen. The processor 120 may analyze the content output screen to identify an object in a screen, and obtain a keyword from an identified object. For example, the processor 120 may identify an object in a screen using a publicly known analysis algorithm, an object recognition algorithm, or the like. The processor 120 may obtain a keyword from the identified object.

According to an embodiment, the processor 120 may identify a "structure" included in a screen as an object, and obtain a name of the structure, a place name of the place where the structure is located, or the like, as a keyword. For example, the processor 120 may identify "the Eiffel Tower" included in a screen, and obtain "the Eiffel Tower," "France," "Paris," or the like, as a keyword.

The embodiment is not limited thereto, and the processor 120 may obtain a keyword based on a content, a keyword based on a content output screen, or the like, using various data. For example, the processor 120 may obtain a keyword based on metadata, fingerprinting, or the like, of a content. As another example, the processor 120 may obtain a keyword based on a text, logo, image, or the like, included in a content output screen. For example, a text included in a screen may be obtained by performing an optical character recognition (OCR) on a content output screen, and a keyword may be obtained based on the text.

As another example, the processor 120 may obtain a keyword based on the content output screen using automatic content recognition (ACR). For example, the processor 120 may obtain at least one of an audio and a video signal on a screen, and may identify a plurality of objects included in the screen based on the obtained signal. The processor 120 may then obtain a keyword based on the identified object. For example, the processor 120 may use ACR to identify at least one of the persons, objects, and places included in the screen and to obtain the content name as a keyword based on at least one of the identified person, object, and place. The name of a specific person may be acquired as a keyword based on the identified person, or the name of a specific object may be acquired as a keyword based on the identified object.

As another example, the processor 120 may obtain keywords related to the content based on metadata of the content, fingerprinting, or the like. For example, the processor 120 may obtain titles, details, producers, production dates, identifiers, management numbers, and the like of the content based on metadata of the content or the like, and may obtain a keyword related to the content. As another example, the processor 120 may obtain a keyword associated with the content based on a feature point of the sound signal or video signal of the content based on automatic content recognition (ACR) applied with fingerprinting technology.

The processor 120 according to an embodiment may identify a category corresponding to the obtained keyword. According to one embodiment, the storage 110 may include a plurality of categories and a plurality of keywords in each of the plurality of categories. For example, the storage 110 may include a "travel" category and a plurality of keywords for the "travel" category such as "airplane," "train," "hotel," "accommodation," "hiking," "beach," "vacation," "Europe," "America," "free travel," "overseas travel," "domestic travel," or the like. In addition, the storage 110 may include various categories and a plurality of keywords for each category.

In the meantime, this is merely exemplary and is not limited thereto. For example, the electronic device 100 may obtain a plurality of categories and a plurality of keywords corresponding to the categories by communicating with a server (not shown). For example, the processor 120 may obtain a keyword based on the content output screen and communicate with the server to identify a category corresponding to the keyword. In addition, the processor 120 may transmit the content output screen to the server and receive the keyword and the category corresponding to the keyword from the server.

The processor 120 according to an embodiment may obtain a use history of at least one application corresponding to a category based on information about a plurality of applications stored in the storage 110. Here, the information about the application may include a category of the application, a use history of the application, or the like. For example, an application may belong to at least one of several categories, such as "travel and regional information," "photo," "social," "lifestyle," or the like, as classified in the application store. The information on the application may include a category of the application and a user's use history of the application, or the like.

The processor 120 may provide guide information for guiding the use of at least one application based on use history information of each of the at least one application. For example, when the identified category is "food," the processor 120 may obtain a use history of at least one application corresponding to the "food." The processor 120 may acquire the use history of the recipe application, the use history of the food delivery application, the use history of the calorie calculation application, or the like, as the use history of at least one application corresponding to the "food" category. Then, the guide information for guiding the use of at least one application may be provided based on the obtained use history. For example, the guide information for guiding "find a pasta recipe in a recipe application" based on the use history of the recipe application. As another example, "order the most recently ordered pizza in the delivery application" may be provided as guide information based on the use history of the delivery application.

The processor 120 according to an embodiment may identify an application related to the keyword on the basis of use history information of each of the at least one application. As an example, a case in which "pizza" is obtained as a keyword based on the content output screen may be assumed. In this case, the processor 120 may identify "delivery" as a category corresponding to "pizza." As the use history of at least one application corresponding to "delivery," the processor 120 may obtain the use history of the pizza A delivery application, the use history of pizza B delivery application, the use history of hamburger C delivery application, or the like. The processor 120 may provide guide information for guiding the use of the pizza A delivery application and pizza B delivery application based on the use history of pizza A delivery application and pizza B delivery application related to the keyword "pizza" among the at least one obtained application use history. For example, the processor 120 may provide "order the most recently ordered pizza in the pizza A delivery application," "check the pizza prices in the pizza B delivery application," or the like, as the guide information. Accordingly, among use history of each of the plurality of applications corresponding to the categories, an application related to a keyword may be identified, and guide information for guiding the use of the identified application may be provided.

In addition, the processor 120 according to one embodiment may identify an application based on at least one of the number of uses and the time of use of each of the at least one application corresponding to the identified category. For example, the processor 120 may identify an application of which number of uses is equal to or greater than a predetermined number of uses, among a plurality of applications corresponding to the identified category, and may provide guide information based on the use history of the identified application. In addition, the processor 120 may identify an application having the largest number of uses, an application having the second highest number of uses, or the like, and may provide guide information based on the use history of the identified application.

As another example, the processor 120 may identify an application which is most recently used among a plurality of applications corresponding to the identified category, and provide guide information based on the use history of the identified application. As another example, the processor 120 may identify an application as many as the predetermined number of applications which are most recently used among a plurality of applications corresponding to the identified category, and provide the guide information based on the use history of the identified application.

As a still another example, the processor 120 may identify an application based on whether at least one application corresponding to the identified category is available. For example, an application requiring an account login, an application requiring update, an application requiring additional settlement (for example, in-app billing) among at least one application may be excluded. The processor 120 may provide guide information based on the use history of the application identified as being usable among the plurality of applications.

The processor 120 according to an embodiment may provide guide information for guiding a use of the application identified with respect to a keyword. For example, a case in which "Italia" is obtained as a keyword based on the content output screen may be assumed. In this case, the processor 120 may identify "travel" as a category corresponding to "Italia." The processor 120 may obtain a use history of an air ticket booking application, a use history of hotel booking application, a use history of a map application, or the like, as use history of at least one application corresponding to "travel." The processor 120 may then provide the guide information for guiding the use of at least one application based on the keyword and obtained use history information of the at least one application. For example, the processor 120 may assume the case in which "booking history of 5-star hotel in Paris" and "booking history of a hotel near the art museum in London" are obtained. In this case, the processor 120 may provide "book a 5-star hotel in Italia in a hotel booking application," and "book a hotel near the art museum in Italia in a hotel booking application," based on the keyword "Italia" and obtained use history. The processor 120 may provide the guide information for guiding the use of the application on the basis of the keyword and the use history information even if there is no history of using the hotel booking in the hotel reservation application.

The processor 120 according to an embodiment may obtain a keyword based on the content output screen, and identify a category corresponding to the keyword. The processor 120 may identify a plurality of keywords corresponding to the category. According to an embodiment, the processor 120 may identify utterance information including at least one of a plurality of keywords among a user's utterance history. The processor 120 may then provide guide information for guiding the use of the identified utterance information.

For example, when "soccer" is identified as a keyword, "sports" may be identified as a category. The processor 120 may identify "baseball," "soccer," "World Cup," "Olympic," or the like, as a plurality of keywords corresponding to "sports." The processor 120 may identify the utterance information including "baseball," "soccer," "World Cup," "Olympic," or the like, among the utterance history of a user.

Here, the user's utterance history may be stored in the electronic device 100. In one example, processor 120 may store a user voice command as a user voice history when a user voice command is received. As another example, the electronic device 100 may receive the user's utterance history from the server and store the utterance history in the storage 110. The processor 120 may identify utterance information including at least one of a plurality of keywords among the user's utterance history. Here, the utterance information may mean a voice command of the user. For example, when a user voice related to at least one of a plurality of applications is received, the processor 120 may store the application and the user voice, or the like, as the utterance history. The processor 120 may identify the utterance history including at least one of "baseball," "soccer," "World Cup," and "Olympic" among the utterance history. The processor 120 may obtain the application and user voice from the identified utterance history. Here, the obtained application and user voice may mean utterance information. The processor 120 may provide guide information for guiding a use of the identified utterance information.

For example, the processor 120 may obtain "sports score application" as an application and "show me game result of team A" as user voice, from the user utterance history. The processor 120 may provide "show me the game result of team A in the sports score application" as the guide information based on the "sports score application" and "show me the game result of team A." For example, the guide information may be information to guide a user's voice command.

According to an embodiment, when a selection command for the guide information is input, the processor 120 may execute an application according to the selected guide information. For example, when a selection command for "find a pasta recipe in a recipe application" provided as guide information is input, the processor 120 may execute the recipe application, and search for the pasta recipe. According to an embodiment, the guide information provided to the user may be information for guiding a voice command of a user. Accordingly, the selection command may be a voice command of a user input through a microphone (not shown).

The processor 120 according to an embodiment may provide guide information for guiding the use of the utterance information based on a selection history of a user with respect to the response information provided based on the identified utterance information, or provide the guide information for guiding the use of the utterance information of other users. Here, the response information may refer to an application identified according to the utterance information and an operation of the corresponding application. For example, the "book an action movie in a movie booking application" may be provided as response information based on the user's utterance information. Then, the electronic device 100 may identify whether a user selects the provided response information. For example, if the response information provided according to the user's utterance information has high matching ratio with the user utterance, the user may select the provided response information. As another example, if the response information provided according to the user utterance information has lower matching ratio with the user utterance, the user may not select the provided response information. The electronic device 100 may generate a selection history in which the selection of the user has been accumulated and recorded.

The electronic device 100 may provide guide information for guiding use of the user utterance information if the selection rate of the user is equal to or greater than a predetermined threshold based on the selection history. As another example, if the selection rate is less than a predetermined threshold value, the electronic device 100 may provide guide information for guiding the use of the utterance information of other users. For example, since the selection rate of the user with respect to the response information provided based on the user utterance information is low, the provided guide information may not be selected. Accordingly, the electronic device 100 may provide the guide information based on the utterance information of other users, rather than the user utterance information. Also, for example, the predetermined threshold value may be 70%. However, the embodiment is not limited thereto, and may be variously set according to the setting of the user, the purpose of the manufacturer, or the like.

As another example, the electronic device 100 may provide guide information for guiding the use of utterance information of other users, regardless of whether the selection rate is below a predetermined threshold value. For example, the electronic device 100 may provide guide information based on both utterance information of a user and utterance information of other users.

FIG. 2 is a block diagram illustrating a detailed configuration of an electronic device illustrated in FIG. 1.

Referring to FIG. 2, the electronic device 100 includes a storage 110, a processor 120, a communication interface 130, a microphone 140, a display 150, and a speaker 160. For the configurations of FIG. 2 overlapping with the configurations of FIG. 1 will not be further described.

The processor 120 according to an embodiment may include a central processing unit (CPU), a read-only memory (ROM or a non-volatile memory) storing a control program for controlling the electronic device 100, a random access memory (RAM or volatile memory) that is used as a storage area for storing data input from an outside of the electronic device 100 or used as a storage area corresponding to various operations performed by the electronic device 100.

The processor 120 controls overall operations of the electronic device 100 using various programs stored in the storage 110.

The processor 120 includes a random access memory (RAM), read-only memory (ROM), a graphic processor, main CPU, first to $n^{th}$ interfaces, and bus. Here, the RAM, ROM, graphic processor, main CPU, first to $n^{th}$ interface, or the like, may be interconnected through the bus.

The ROM stores a command set for booting the system and the like. When the turn-on command is input and power is supplied, the main CPU copies the O/S stored in the storage 110 to the RAM according to the instruction stored in the ROM, executes O/S to boot the system. When the booting is completed, the main CPU may copy various programs stored in the memory to the RAM, execute programs copied to the RAM, and perform various operations.

A graphic processor generates a screen including various objects such as an icon, an image, a text, or the like, using an operator and a renderer. The operator may operate an attribute value such as a coordinate value, a shape, a size, a color, or the like, at which each object is displayed according to a layout of a screen.

The main CPU accesses the storage 110 and performs booting using the O/S stored in the storage 110. The main CPU performs various operations using various programs and content data, or the like, stored in the storage 110.

The first to $n^{th}$ interface are connected to the various elements as described above. One of the interfaces may be network interface which is connected to an external device through network.

Here, the storage 110 may be implemented as an internal memory such as the ROM, RAM, or the like, included in the processor 120, or a memory separate from the processor 120. In this case, the storage 110 may be implemented as a memory type embedded in the electronic device 100 according to a data storage use, or a memory type detachable from the electronic device 100. For example, the data for driving the electronic device 100 may be stored in a memory embedded in the electronic device 100, and the data for expansion of the electronic device 100 may be stored in a memory detachable from the electronic device 100. The memory embedded in the electronic device 100 may be implemented as a format such as a non-volatile memory, a volatile memory, a hard disk drive (HDD) or a solid state drive (SSD), or the like, and a memory detachable from an acoustic output device 100 may be implemented as a format such as a memory card (for example, a micro secure digital (SD) card, a universal serial bus (USB) memory, or the like), an external memory connectable to the USB port (for example, USB memory), or the like.

The communication interface 130 is a configuration to communicate with an external device. In particular, the communication interface 130 may communicate with other external devices. At this time, the external device may be an electronic device capable of outputting image content. For example, if an external device is a TV, the type of external device is an imaging device, and the output data information on a TV may include, but may not be limited to, the model name of the TV, the audio characteristics of the TV's output content, and the frequency characteristics of the output audio among the TV's output content. In addition, external devices that the communication interface 130 communicates with may include a Bluetooth speaker, a lighting device, a smart cleaner, a smart refrigerator, and an Internet of Things (TOT) home manager, or the like, in addition to devices capable of outputting an image content.

When communicating with an external device including a microphone, the communication interface 130 may receive information on a voice signal of an utterer received by the external device. In this case, the communication interface 130 may receive a user voice of a user input through an external device. This is merely exemplary, and the communication interface 130 may receive a signal through the BT module.

The communication interface 130 may include a communication module for at least one communication methods such as wireless fidelity (WI-FI), a bluetooth (BT), a near field communication (NFC), global positioning system (GPS), Ethernet through carrier sense multiple access/collision detection (CSMA/CD), or cellular communication (for example, for example: long term evolution (LTE), long term evolution-advanced (LTE-A), code division multiple access (CDMA), wideband code division multiple access (WCDMA), universal mobile telecommunications system (UMTS), wireless broadband internet (Wibro) or global system for mobile communications (GSM), etc.), wired/wireless local area network (LAN), wide area network (WAN), IEEE 1394, high definition multimedia interface (HDMI), universal serial bus (USB), mobile high-definition link (MHL), advanced encryption standard (AES)/European broadcasting union (EBU), optical, and coaxial.

In particular, the communication interface 130 may receive information on a plurality of applications from an external device. For example, information on a plurality of applications received from the external device may include a category of each of the plurality of applications stored in the external device and use history of an application, or the like. As another example, the communication interface 130 may receive information on the plurality of applications stored in the external device through the server. The information on applications stored in the electronic device 100 and each of the other electronic devices may be transmitted to the server. The electronic device 100 may receive information on a plurality of applications stored in the electronic device 100 and information on a plurality of applications stored in other electronic devices from the server. For example, use history for a plurality of electronic devices which a user uses as the same account may be transmitted to the server, and the electronic device 100 may perform communication with the server and at least one of the other electronic devices and receive information on the plurality of applications stored in the other electronic devices.

The communication interface 130 according to an embodiment may receive a user utterance history stored in the external device. For example, a user voice related to at least one of a plurality of applications stored in the external device may be stored as the utterance history, and the communication interface 130 may receive utterance history stored in the external device by communicating with the external device. The embodiment is not limited thereto, and the communication interface 130 may communicate with the server and receive the user utterance history stored in each of the plurality of other electronic devices.

The processor 120 according to an embodiment may obtain a keyword based on the content output screen and identify a category corresponding to the obtained keyword. The processor 120 may obtain use history of at least one application corresponding to a category based on information on a plurality of applications stored in the external device and information on a plurality of applications stored in the storage 110, received through the communication interface 130. Then, based on use history information of each of the at least one application, the guide information for guiding the use of the application may be provided.

When a selection command for an application included in the guide information is input, the processor 120 may execute a selected application. In particular, when the selected application is included in a plurality of applications stored in an external device, a control command to execute the selected application may be transmitted to an external device through the communication interface 130.

The communication interface 130 according to an embodiment may transmit, to the server, information on a plurality of applications stored in the electronic device 100, a user utterance command for the electronic device 100, an utterance command, or the like.

The communication interface 130 according to an embodiment may transmit a user voice to the server. The server may convert the user voice received from the electronic device 100 to the text information and transmit the text information to the electronic device 100. For example, the server may convert the user voice received from the electronic device 100 to the text information using an algorithm for speech to text (STT), but is not limited thereto. The electronic device 100 may convert the user voice to the text information by itself.

A microphone 140 may receive a user utterance voice. The electronic device 100 according to an embodiment may execute an application and perform an operation according to a user voice received through the microphone 140. For example, when a user's voice command to select provided guide information is received through the microphone 140, the processor 120 may execute an application included in the selected guide information. According to an embodiment, the electronic device 100 may receive a user utterance voice through the microphone 140, and receive a user utterance voice through a microphone provided in a remote control device (not shown) of the electronic device 100. As another example, the electronic device 100 may communicate with the user terminal device (not shown) through the communication interface 130, and receive a user utterance voice from the user terminal device.

For example, the user terminal device may include an application capable of communicating with the electronic device 100. As an example, a remote control application for controlling the electronic device 100 may be installed in the user terminal device. The user terminal device may transmit a user utterance voice to the electronic device 100 using a remote controller application. Here, the remote controller application may include a user interface (UI) for guiding the control of the electronic device 100. The remote controller application may be preinstalled in the user terminal device, or installed in the user terminal device according to selection of a user or a manufacturer, or the like.

The display 150 may provide various content screens available through the electronic device 100. Here, the content screen may include various content such as an image, a moving image, a text, music, or the like, an application execution screen, a graphic user interface (GUI) screen, or the like.

The display may be implemented as various shapes such as a liquid crystal display (LCD), an organic light-emitting diode (OLED), a liquid crystal on silicon (LCoS), a digital light processing (DLP), a micro LED, a quantum dot (QD) display panel, and the like, but is not limited thereto. The display may also be implemented as a flexible display, a transparent display, or the like, for some cases.

According to an embodiment, the display may include not only a display panel for outputting an image but also a bezel which houses the display panel. In particular, according to an embodiment, the bezel may include a touch sensor (not shown) for sensing a user interaction.

In particular, the display 150 according to an embodiment may display a content output screen, guide information, or the like.

The display 150 provided in the electronic device 100 may display various screens processed by the graphic processor. The electronic device 100 may include the display 150 as an element, but when various screens are displayed on a display included in an external device, various screens may be displayed on the display of the external device using the interface.

A speaker 160 performs a function to output an audio signal. The speaker 160 may include at least one speaker unit (or an audio amplifier). In particular, the electronic device 100 according to an embodiment may output the content through the speaker 160. The processor 120 may obtain a keyword based on the sound which is being output through the speaker 160. For example, the processor 120 may obtain a keyword by performing voice recognition on a sound signal being output through the speaker 160. For example, when "Spain" is obtained from the sound signal being output as a keyword, the processor 120 may obtain "travel", "geographic information", or the like, corresponding to "Spain" as a category. The processor 120 may obtain the use history of at least one application corresponding to the category such as "travel" and output guide information for guiding the use of the application based on the use history information through the speaker 160. For example, when the air ticket booking application is identified and the "book a ticket to Barcelona" is obtained in the use history of the ticket booking application, the processor 120 may output "May I book the ticket to Barcelona through an air ticket booking application?" as the guide information through the speaker 160. Then, when a user input for selecting the guide information is received, the processor 120 may execute the air ticket booking application and perform air ticket booking to Barcelona. Here, the user input may be a voice command received via the microphone 140.

A remote control signal receiver (not shown) is a configuration to receive the remote control signal transmitted from the remote controller. The remote control signal receiver may be implemented to include a light receiver for receiving an Infra Red (IR) signal, or may be implemented in a form of receiving a remote control signal by performing communication according to a wireless communication protocol such as a remote control and Bluetooth or Wi-Fi. For example, the remote control signal receiver may include a wireless communication chip. Here, the wireless communication chip means a chip performing communication according to various communication standards such as IEEE, Zigbee, 3rd generation (3G), 3rd generation partnership project (3GPP), long term evolution (LTE), Wi-Fi, Bluetooth, or the like. The electronic device 100 according to an embodiment may receive a user voice input through a microphone provided in the remote controller through a remote controller signal receiver.

Here, the remote control signal receiver may perform wireless communication with the remote controller, and may receive the user voice, control command, and the like from the remote controller. For example, the electronic device 100 may receive a user utterance voice input through a microphone provided in the remote controller through a remote control signal receiver. However, the embodiment is not limited thereto. The electronic device 100 may communicate with a remote controller through various types of communication methods through a remote controller signal receiver, and transceive user voice, control command, data, various types of signals, or the like, with the remote controller.

The electronic device 100 according to one embodiment includes an interface (not shown). The interface may transmit content and guide information by performing wired/wireless communication with a display device (not shown). For example, the interface may communicate with the display device through various communication methods such as HDMI, digital visual interface (DVI), display port (DP), component, wired Ethernet, WI-FI, Bluetooth, or the like. According to one embodiment, the electronic device 100, as a source device, may transmit content and guide information to a display device. However, the embodiment is not limited thereto, and content, guide information, or the like, may be output through the display 150 provided in the electronic device 100.

The interface according to one embodiment is a configuration for connecting an external device to input and output video and audio. Specifically, the input and output interface includes a universal serial bus (USB), a high definition multimedia interface (HDMI), a recommended standard 232 (RS-232), a plain old telephone service (POTS) DVI, DP, Thunderbolt, or the like. The HDMI is a high performance data transmission interface for an audio and video (AV) device which outputs audio and video. DP is an interface capable of realizing ultra-high resolution screen such as 2560×1600 or 3840×2160, 3D stereoscopic image as well as 1920×1080 full HD, and also delivering digital voice. Thunderbolt is an input and output interface for high-speed data transmission and connection, and may connect PC, display, and storage devices all in a single port.

The input and output terminals described above are merely exemplary, and the input and output interface may include a port to output an audio signal only or a port to output a video signal only.

Figure 3:
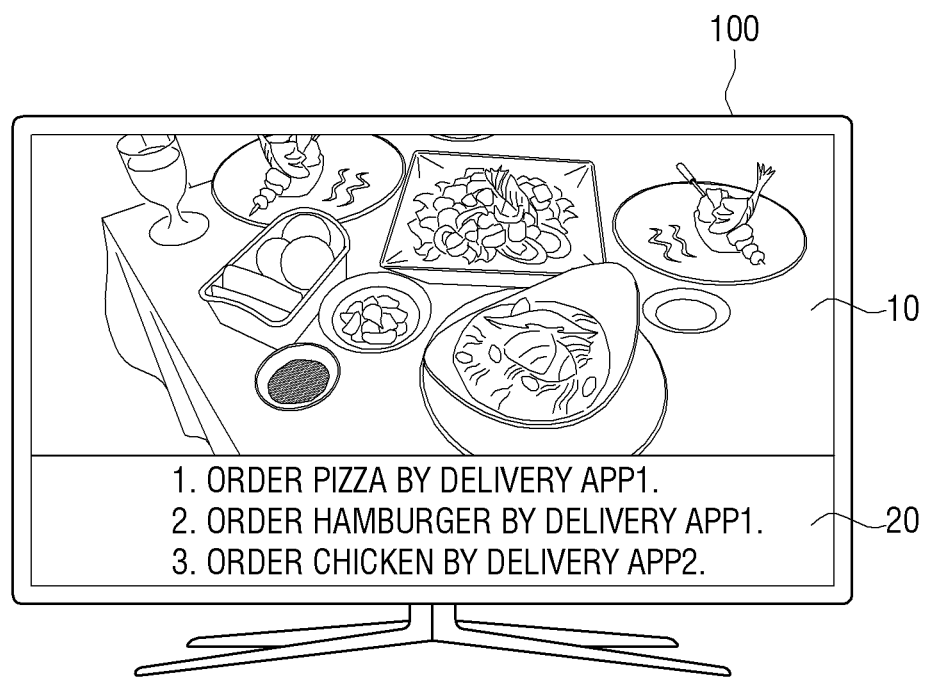
FIG. 3 is a view provided to describe guide information according to an embodiment.

FIG. 3 is a view provided to describe guide information according to an embodiment.

Referring to FIG. 3, the electronic device 100 may be implemented as a display device, but is not limited thereto. The electronic device 100 may be connected to another electronic device having a display, and transmit content and guide information to another electronic device. For convenience of description, the case where the electronic device 100 outputs content and guide information will be described.

The electronic device 100 may obtain a keyword based on a content output screen 10. The electronic device 100 may identify a plurality of objects using an image analysis algorithm, an object recognition algorithm, or the like, to the content output screen 10. For example, as illustrated in FIG. 3, the electronic device 100 may identify a plurality of food objects using the object recognition algorithm to the content output screen 10. Based on the plurality of identified food objects, "food" may be identified as a category. As another example, based on the content output screen, "Chinese food" may be identified as a keyword. As a still another example, an object according to a predetermined condition, from among a plurality of objects, may be obtained as a keyword. For example, when an object having the largest size is "pizza" among the plurality of objects, the electronic device 100 may obtain "pizza" as a keyword based on the content output screen 10. As another example, when the object corresponding to "food", among the plurality of identified objects, is identified to be greatest, the electronic device 100 may identify "food" as a category.

The electronic device 100 according to an embodiment may obtain a use history of at least one application corresponding to the identified category based on the information on the plurality of applications. For example, the electronic device 100 may include a plurality of applications corresponding to various categories such as a game, sports, a reservation, a delivery, or the like, and each of a plurality of applications may be included in at least one category. The electronic device 100 may obtain a use history of the at least one application included in the identified category. For example, when the identified category is "food," use history of "delivery application," "restaurant search application," "recipe application," or the like may be obtained as an application included in "food."

The electronic device 100 according to an embodiment may provide the guide information 20 for guiding the use of the plurality of corresponding applications based on use history information of each of the plurality of applications. Here, the guide information 20 may be obtained based on the use history information. For example, from the use history of "delivery application," "pizza order history" and "hamburger order history" may be obtained, and the "Chinese food search history" may be obtained from the "recipe application" use history. The electronic device 100 may display the guide information 20 for guiding the use of a plurality of applications, for example, "delivery application" and "recipe application" based on the obtained use history information. Referring to FIG. 3, the guide information 20 may provide "order pizza by delivery App1," "order hamburger by delivery App1," "order chicken by delivery App2," or the like. Here, the guide information 20 may be information to guide a voice command of a user. When a user utters "order pizza by delivery App1" through the microphone 140 provided in the electronic device 100, the electronic device 100 may order pizza by executing the delivery App1. As another example, the user voice command may be received through a microphone provided in a remote controller (not shown). As a still another example, a user's voice command may be received through a microphone provided in the smartphone communicating with the electronic device 100.

The electronic device 100 according to one embodiment of the disclosure may provide guide information for guiding the use of the application on the basis of keywords (for example, Chinese dishes) obtained based on the content output screen, identify the category including the keyword, and provide the guide information for guiding the use of the application corresponding to the identified category. Accordingly, even when a "Chinese dish" is obtained as a keyword, the electronic device 100 may obtain and provide the guide information based on use history information of various applications such as a recipe application, a pizza delivery application, or the like.

Figure 4:
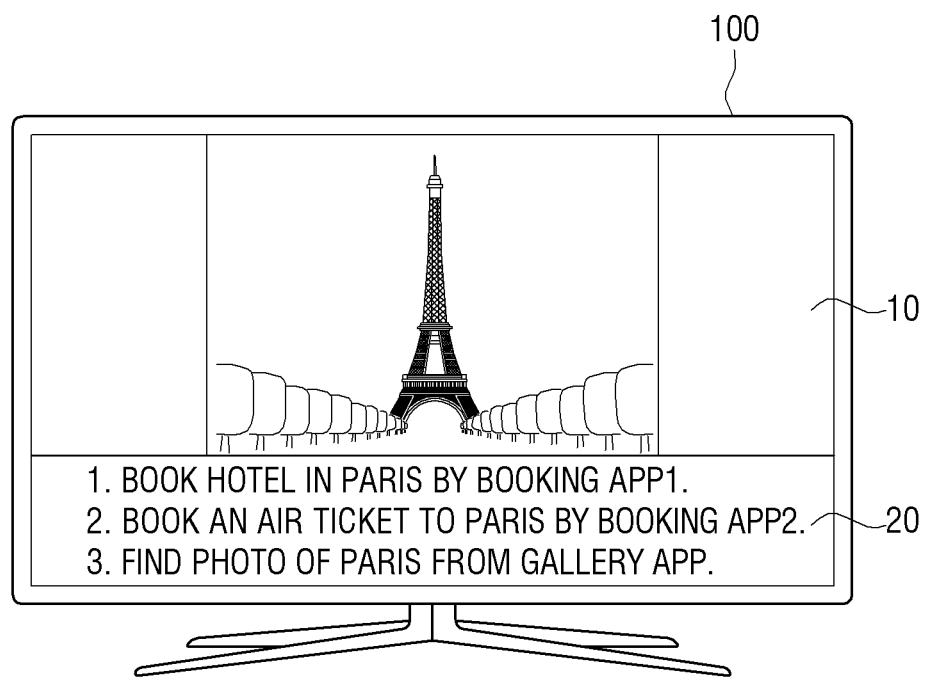
FIG. 4 is a view provided to describe guide information according to another embodiment.

FIG. 4 is a view provided to describe guide information according to another embodiment.

Referring to FIG. 4, the electronic device 100 may identify a famous structure (for example, the Eiffel Tower) on the content output screen 10. The electronic device 100 may then obtain a keyword according to the identified object, the name of the identified structure. For example, the electronic device 100 may obtain the Eiffel Tower, Paris, or the like, as a keyword. According to one embodiment, the electronic device 100 may transmit the content output screen 10 to a server and receive results of image search, ACR, image analysis algorithms, and object recognition algorithms on the content output screen from the server. The electronic device 100 may obtain a keyword based on the result of execution received from the server. However, the embodiment is not limited thereto, and the electronic device 100 may obtain a keyword by performing various types of image analysis algorithms on the content output screen 10. As another example, the electronic device 100 may obtain a keyword based on content metadata, fingerprinting, OCR performed on the content output screen 10, or the like.

Figure 6:
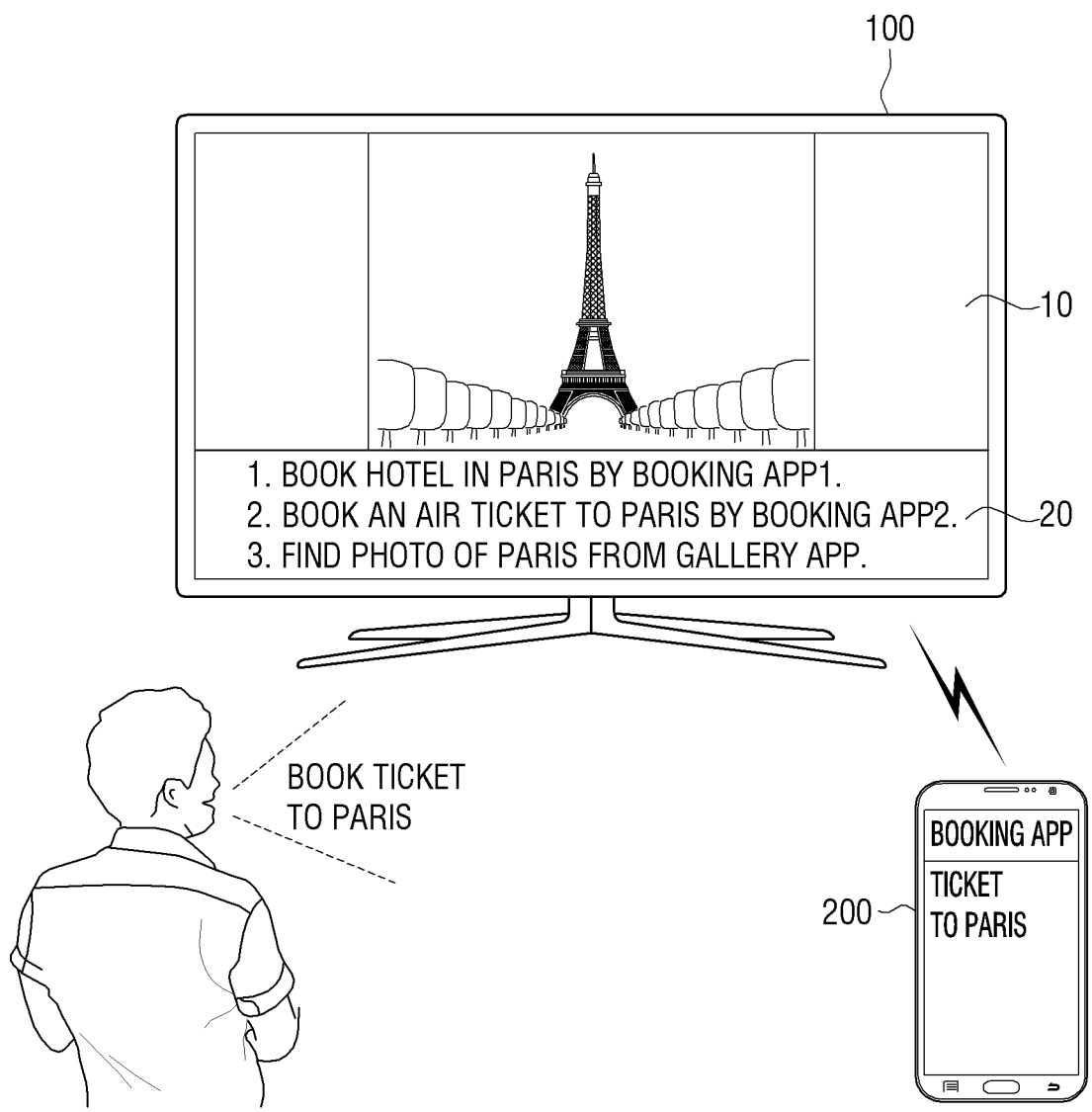
FIG. 6 is a view provided to describe an electronic device and an external device according to an embodiment.

The electronic device 100 may identify the category corresponding to the obtained keyword and obtain the use history of at least one application corresponding to the identified category. Referring to FIG. 6, when the Eiffel Tower, Paris, or the like, are obtained as the keywords, the electronic device 100 may identify a "travel" category as a category corresponding to a keyword. Subsequently, the electronic device 100 may obtain a use history of each of a plurality of applications included in the "travel" category. For example, the electronic device 100 may obtain "hotel booking application use history," "air ticket booking application use history," "Paris metro application use history," or the like. The electronic device 100 may identify the application associated with the keyword and provide the guide information 20 for guiding the use of the identified application. For example, if the word Paris is a keyword, the guide information 20 may be provided based on the use history of each of the plurality of acquired applications, that is, "the Paris metro application use history." For example, the electronic device 100 may provide "let me know a metro route to The Louvre Museum" as the guide information 20. According to an embodiment, when "let me know a metro route to The Louvre Museum" is received by the user voice command, the electronic device 100 may execute the Paris metro application, and search and provide the metro route to The Louvre Museum. This is merely exemplary, and if the user voice command is different from the provided guide information 20, the electronic device 100 may execute the application. For example, if "let me know a metro route to The Orsay Museum" which is different from the provided guide information 20 is received by the user voice command, the electronic device 100 may execute the Paris metro application, and search and provide the metro route to The Orsay Museum.

The electronic device 100 according to an embodiment may identify an application based on at least one of the number of uses of each of the at least one applications and use timing. For example, it is assumed that the electronic device 100 obtains the use history of each of booking App1, booking App2, and booking App3 by the booking application. The electronic device 100 may identify the booking App1 and booking App2 based on at least one of the number of uses and use timing of each of the booking App1, booking App2, and booking App3. For example, the number of uses may be in a descending order of booking App1 and booking App2. In this case, the electronic device 100 may provide the guide information 20 for guiding the use of the identified applications, that is, booking App1 and booking App2.

The electronic device 100 according to an embodiment may provide the guide information 20 for guiding the use of the identified application associated with a keyword. For example, when a hotel booking App1 and a plane booking App2 are identified based on at least one of the number of uses and use timing in the "travel" category, the electronic device 100 may provide the guide information 20 for guiding the use of the hotel booking App1 and the plane booking App2 with respect to the keyword "Paris." As illustrated in FIG. 4, "book the accommodation in Paris by booking App1" and "book the ticket to Paris by booking App2" as the guide information 20.

The electronic device 100 according to an embodiment may provide guide information for guiding the use of an application with respect to a keyword, if the use history of each of the plurality of applications corresponding to the category is not related to a keyword. When there is no "Paris accommodation booking history" in the hotel booking App1 use history, the electronic device 100 may provide "book the Paris accommodation by booking App1" as the guide information 20 for guiding the use of the hotel booking App1 with respect to the identified keyword "Paris."

Figure 5:
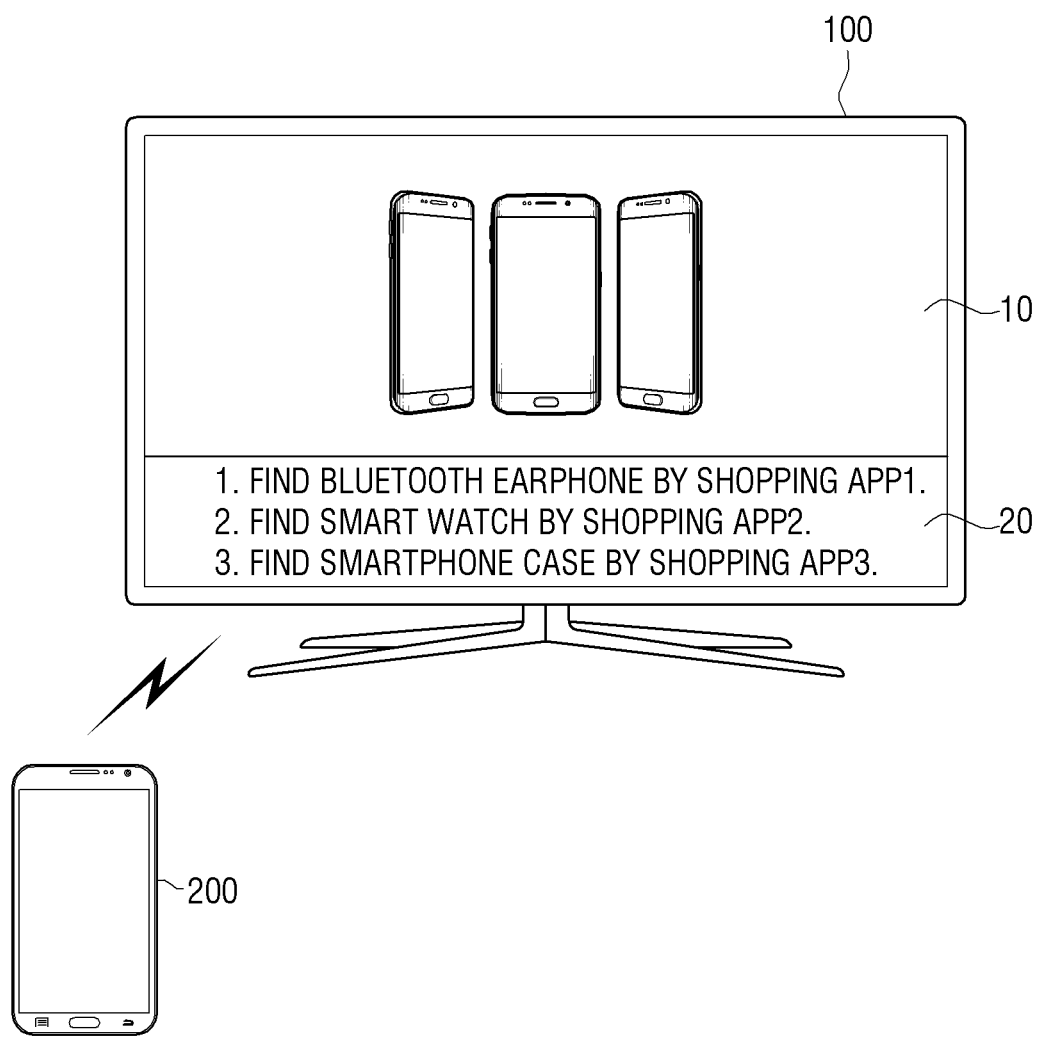
FIG. 5 is a view provided to describe an electronic device and an external device according to an embodiment.

FIGS. 5 and 6 are views provided to describe an electronic device and an external device according to an embodiment.

The electronic device 100 according to an embodiment may communicate with an external device 200. Referring to FIG. 5, the electronic device 100 may obtain "smartphone" as a keyword in the content output screen 10. Then, the electronic device 100 may identify "smartphone," "shopping" or the like, as the categories corresponding to the "smartphone." The electronic device 100 may obtain a use history of a plurality of applications corresponding to the identified categories, "smartphone" and "shopping."

Here, the use history of the plurality of applications may be stored in the external device 200. The electronic device 100 may perform communication with the external device 200 and obtain a use history of a plurality of applications stored in the external device 200.

For example, the electronic device 100 may obtain use history of each of shopping App1, shopping App2, and shopping App3 corresponding to "shopping" which is the identified category, and the shopping App1, shopping App2, and shopping App3 may be an application stored in the external device 200.

The electronic device 100 may provide the guide information 20 for guiding the use of at least one application based on use history information of each of the at least one application. For example, "find a Bluetooth earphone by shopping App1," "find a smart watch by shopping App2," "find a smartphone case by shopping App3" may be provided as the guide information 20. Here, each of the Bluetooth earphone, smart watch, and smartphone case may be a part of the plurality of keywords included in the "shopping" category.

In the meantime, identification of "smartphone" "shopping" or the like as the category corresponding to "smartphone" by the electronic device 100 is merely an embodiment. For example, the electronic device 100 may communicate with the server and transmit "smartphone" as a search word, and receive from the server a superordinate concept including the "smartphone", that is, the category. As another example, the electronic device 100 may obtain a category corresponding to a keyword based on database stored by a manufacturer at the time of manufacturing the electronic device 100 and database set by a user, or the like.

The electronic device 100 according to one embodiment may identify the utterance information that includes at least one of a plurality of keywords among the user utterance history. For example, a user utterance including "Bluetooth earphone", "smart watch", and "smartphone case" which are a part of a plurality of keywords in the same category as the obtained keyword "smartphone" may be identified. For example, the electronic device 100 may identify an utterance history including "Bluetooth earphone" among the user utterance history. The electronic device 100 may then identify an application associated with the user utterance history and corresponding utterance history. The electronic device 100 may identify one of the user utterance histories, "find the lowest price of Bluetooth earphone" and "Shopping App1" as utterance information. The electronic device 100 may provide the identified utterance information as the guide information 20. For example, the electronic device 100 may provide "find Bluetooth earphone by shopping App1" and "find the lowest price of Bluetooth earphone by shopping App1" as the guide information 20.

According to one embodiment, a plurality of applications may be stored in the external device 200 that communicates with the electronic device 100. The electronic device 100 may provide the external device 200 with a control command for executing the application corresponding to the selected guide information 20 in accordance with the user's selection command for the guide information 20. For example, it is assumed that "find smart watch with Shopping App2" is provided as the guide information 20 and "find smart watch with Shopping App2" is selected according to a user's selection command. Here, if the shopping application App2 is an application stored in the external device 200, the electronic device 100 may transmit a control command for executing the shopping application App2 to the external device 200, in response to the user's selection command.

Referring to FIG. 6, the guide information 20 may be information to guide a user's voice command. When a user's voice command is received according to the guide information 20 provided through the electronic device 100, the electronic device 100 may provide a control command to execute the selected application to the external device 200 according to a user's voice command.

For example, the electronic device 100 may receive information on a plurality of applications from the external device 200. The electronic device 100 may then obtain use history information of each of the at least one application corresponding to the identified category (for example, "travel") from the information for the plurality of applications. For example, the electronic device 100 may obtain the use history of the hotel booking App1, the use history of the ticket booking App2, and the use history of the gallery App. The electronic device 100 may provide the guide information 20 for guiding the use of the application based on the obtained use history. In the meantime, the hotel booking App1, the ticket booking App2, and the gallery App may be applications stored in the external device 200.

When the selection command for the application included in the guide information 20 is input, the electronic device 100 may provide a control command to execute the selected application to the external device 200.

For example, when the user selection command of "book a ticket to Paris," the electronic device 100 may transmit to the external device 200 to control the external device 200 to execute the booking App2 to book a ticket to Paris.

Figure 7:
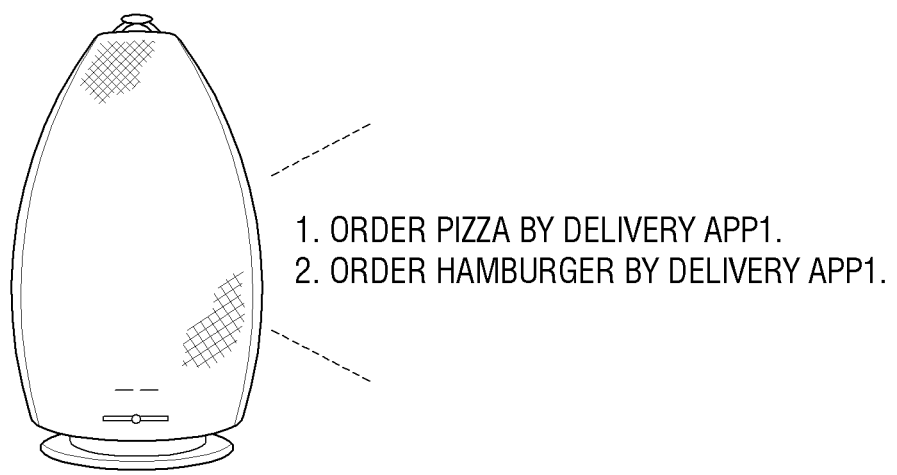
FIG. 7 is a view provided to describe an electronic device according to another embodiment.

FIG. 7 is a view provided to describe an electronic device according to another embodiment.

Referring to FIG. 7, the electronic device may not include the display 150. For example, the electronic device may be implemented as an artificial intelligence (AI) speaker provided with a speaker 160, or the like.

The electronic device 100 may obtain a keyword based on the sound output through the speaker 160. The electronic device 100 according to one embodiment may obtain text information from the sound output for a predetermined time and obtain keywords from the obtained text information. Here, the predetermined time may be variously set according to the setting of the user, the purpose of the manufacturer, or the like.

The electronic device 100 may identify a category corresponding to the obtained keyword, obtain a use history of at least one application corresponding to the identified category, and provide guide information for guiding the use of the corresponding application based on the use history information.

As another example, the electronic device 100 may obtain a plurality of keywords corresponding to the identified category. For example, a "hamburger", a "pizza", or the like, corresponding to the "food" category may be obtained. Then, the electronic device 100 may identify the utterance history including the "hamburger" and "pizza" obtained from the user utterance history. In addition, the application corresponding to the identified category may be identified. For example, a "delivery application", a "recipe application", or the like, corresponding to the "food" category may be identified. The electronic device 100 may provide the guide information 20 for guiding the use of the identified utterance information based on the identified utterance history and application. Here, the utterance information may mean a combination between the utterance history of the identified user and the identified application. For example, "order pizza by the delivery App1" and "order hamburger by the delivery App1" which is the utterance information according to the combination of the user utterance history and "delivery application" as the guide information 20.

Figure 8:
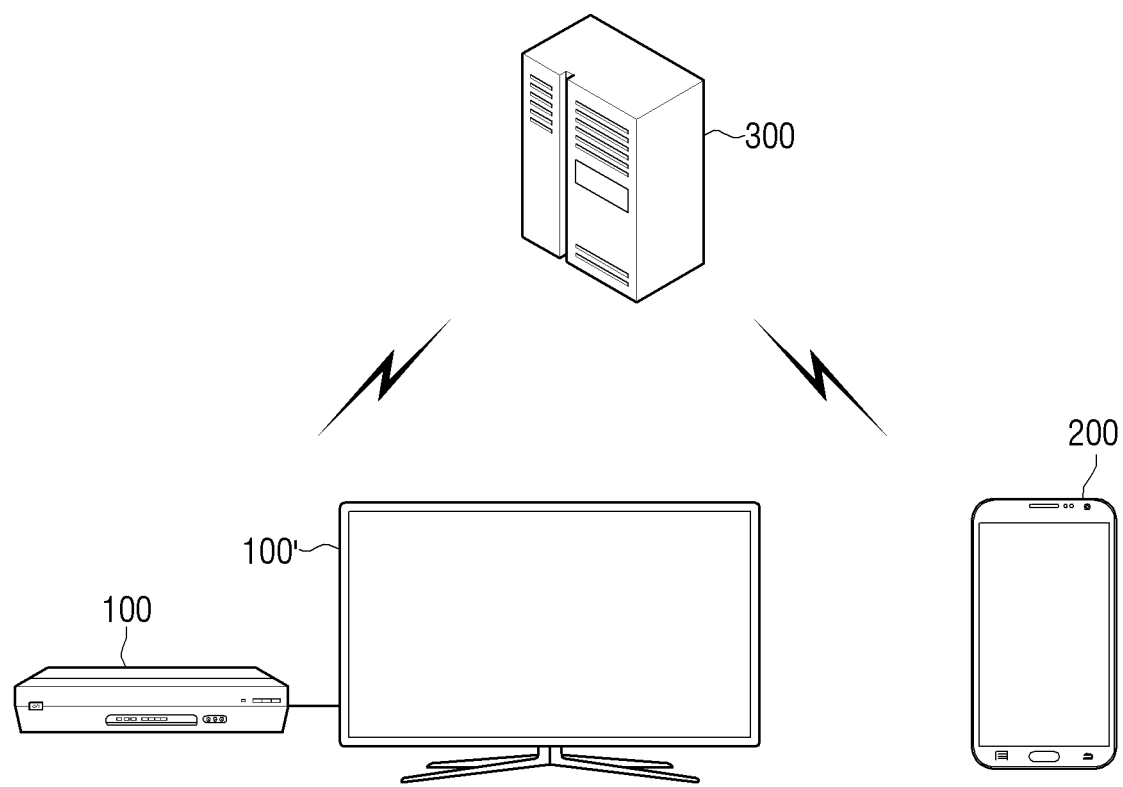
FIG. 8 is a view provided to describe a server according to an embodiment.

FIG. 8 is a view provided to describe a server according to an embodiment.

The electronic device 100 according to an embodiment may be connected to a display device and transmit content and guide information 20 to a display device. As another example, the electronic device 100 may be implemented as a display device 100' having a display itself.

The electronic device 100 according to an embodiment may transmit the content output screen 10 to a server 300 and receive a keyword based on the content output screen 10 and a category corresponding to the keyword from the server 300.

Also, when the user voice related to at least one application stored in the electronic device 100 is received, the electronic device 100 may store the user voice as use history information for the application. Here, the electronic device 100 may transmit use history information to the server 300. The server 300 according to one embodiment may store the use history information transmitted from the electronic device 100 and the use history information transmitted from the external device 200.

The electronic device 100 according to an embodiment may provide guide information 20 for guiding the use of a plurality of applications stored in the external device 200. If the selection command for the application included in the guide information is input and the selected application is any one of a plurality of applications stored in the external device 200, the electronic device 100 may transmit a command to control execution of the corresponding application to the external device 200 through the server 300. For example, the electronic device 100 may transmit a control signal corresponding to the selection command to the server 300. The server 300 may transmit a control signal to the external device 200. The external device 200 may execute an application and perform an operation according to a control signal received from the server 300. However, this is merely exemplary, and the electronic device 100 and the external device 200 may perform communication and transceive a control command, information on each of the plurality of applications, and various data.

Meanwhile, the server 300 according to an embodiment may perform voice recognition on the user voice received from the electronic device 100 and obtain text information. The server 300 may then transmit the obtained text information to the electronic device 100. However, this is merely exemplary, and the electronic device 100 itself may perform voice recognition on user voice, and obtain text information.

FIG. 9 is a flowchart provided to describe a control method of an electronic device according to an embodiment.

A control method of an electronic device according to an embodiment obtains a keyword based on a content output screen in S910.

Then, a category corresponding to a keyword is identified in S920.

A use history of at least one application corresponding to a category identified based on information on a plurality of applications is obtained in S930.

Based on use history information of each of at least one application, guide information for guiding the use of at least one application is provided in S940.

Here, the step S940 of providing the guide information may include a step of identifying an application related to the keyword based on the use history information of each of the at least one application, and a step of providing guide information for guiding the use of the identified application.

The step S940 of providing the guide information according to an embodiment may include a step of identifying an application based on at least one of the number of uses and the use timing of each of the at least one application, and providing the guide information for guiding the use of the identified application.

Here, the step S940 of providing the guide information may provide the guide information for guiding the use of the identified application with respect to the keyword.

The control method according to an embodiment may include the step of identifying a plurality of keywords corresponding to the identified category and, based on the utterance information including at least one of the plurality of keywords, among a plurality of keywords, being identified in the user utterance history, providing the guide information for guiding the use of the identified utterance information.

Here, the control method according to an embodiment may include providing the guide information for guiding the utterance information based on the user's selection history for the response information provided based on the identified utterance information or providing guide information for guiding the use of the utterance information of another user.

The control method according to an embodiment may include receiving information on a plurality of applications from an external device and, based on a selection command for an application included in the guide information being input, providing a control command to execute the selected application to the external device.

The step of, based on a user voice related to at least one of a plurality of applications being received, storing a user voice as use history information for the application may be included.

The guide information may be information to guide the voice command of the user.

Meanwhile, the control method according to an embodiment may include a step S910 of obtaining a keyword associated with a content output screen, a step S920 of identifying a category corresponding to a keyword, a step S930 of obtaining use history of at least one application corresponding to the identified category based on the information on the plurality of applications, a step S940 of providing guide information for guiding use of at least one application based on use history information of each of the at least one application. When a selection command for an application included in the guide information is input and the selected application is an application included in the external device, a control command for executing the selected application may be provided to the external device.

The various embodiments described above may be embodied in a recording medium which may be read by a computer or a similar device by using software, hardware or combination thereof. In some cases, the embodiments described herein may be implemented by the processor itself. According to a software implementation, embodiments such as the procedures and functions described herein may be implemented in separate software modules. Each of the software modules may perform one or more of the functions and operations described herein.

Computer instructions for performing a processing operation according to the above-described various embodiments may be stored in a non-transitory computer-readable medium. The computer instructions stored in the non-transitory computer-readable medium may allow a specific device to perform the processing operation according to the above-described embodiments when the computer instructions are executed through a processor.

The non-transitory computer-recordable medium is not a medium configured to temporarily store data such as a register, a cache, or a memory but an apparatus-readable medium configured to semi-permanently store data. Specifically, the non-transitory apparatus-readable medium may be a compact disc (CD), a digital versatile disc (DVD), a hard disc, a Blu-ray disc, a universal serial bus (USB), a memory card, a read only memory (ROM), and the like.

The present teaching can be readily applied to other types of apparatuses. Also, the description of embodiments is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined by the following claims and their equivalents.

What is claimed is:

1. An electronic device comprising:
a storage
a display; and
a processor configured to:
   display an image of a content on the display,
   perform an operation to identify a keyword corresponding to the content which is currently displayed,
   identify a category corresponding to the identified keyword,
   identify at least one application corresponding to the identified category,
   obtain a use history related to the at least one application corresponding to the identified category,
   provide, based on the use history, guide information for guiding a user to utter to use the at least one application, the guide information including a text command having an identifier identifying the at least one application and being provided with the image of the content, and
   in response to a user's utterance corresponding to the text command, execute the at least one application to perform an operation corresponding to the text command.

2. The electronic device of claim 1, wherein the processor is further configured to:
identify an application related to the keyword based on the use history information of each of the at least one application, and provide the guide information for guiding the user to utter to use the identified application, the text command having the identifier identifying the identified application.

3. The electronic device of claim 1, wherein the processor is further configured to:
identify an application based on at least one of a number of uses or use timing for each of the at least one application, and provide the guide information for guiding the user to utter to use the identified application, the text command having the identifier identifying the identified application.

4. The electronic device of claim 3,
wherein the text command further comprises a text for guiding use of the identified application related to the keyword.

5. The electronic device of claim 1, wherein the processor is further configured to:
identify a plurality of keywords corresponding to the identified category, and
based on utterance information including at least one of the plurality of keywords being identified from among a user's utterance history, provide the guide information for guiding use of the identified utterance information.

6. The electronic device of claim 5, wherein the processor is configured to:
provide the guide information for guiding use of the utterance information based on a user's selection history for response information provided based on the identified utterance information, or provide guide information for guiding of the user to select utterance information of another user.

7. The electronic device of claim 1, further comprising:
a communication interface,
wherein the processor is further configured to:
   receive information on the plurality of applications from an external device through the communication interface, and
   based on a selection command for an application included in the guide information being selected, provide a control command for executing the selected application, to the external device.

8. The electronic device of claim 1,
wherein the processor is further configured to, based on the user's utterance related to at least one of the plurality of applications being received, store the user's utterance to the use history related to the at least one of the plurality of applications.

9. The electronic device of claim 1, further comprising:
a display,
wherein the processor is further configured to control the display to display the output screen and the guide information.

10. The electronic device of claim 1, further comprising:
a speaker,
wherein the processor is further configured to obtain the keyword based on sound which is being output through the speaker.

11. A control method of an electronic device, the method comprising:
displaying an image of a content
performing an operation to identify a keyword corresponding to the content which is currently displayed,
identifying a category corresponding to the identified keyword;
identifying at least one application corresponding to the identified category;
obtaining a use history related to at least one application corresponding to the identified category; and
providing, based on the use history, guide information for guiding a user to utter to use the at least one application, the guide information including a text command having an identifier identifying the at least one application and being provided with the image of the content, and
in response to a user's utterance corresponding to the text command, executing the at least one application to perform an operation corresponding to the text command.

12. The method of claim 11, wherein the providing the guide information comprises:
identifying an application related to the keyword based on the use history information of each of the at least one application; and
providing the guide information for guiding the user to utter to use the identified application, the text command having the identifier identifying the identified application.

13. The method of claim 11, wherein the providing the guide information comprises:
identifying an application based on at least one of a number of uses or use timing for each of the at least one application; and
providing guide information for guiding the user to utter to use the identified application, the text command having the identifier identifying the identified application.

14. The method of claim 13, wherein the text command further comprises a text for guiding use of the identified application related to the keyword.

15. The method of claim 11, further comprising:
identifying a plurality of keywords corresponding to the identified category; and
based on utterance information including at least one of the plurality of keywords being identified from among a user's utterance history, providing the guide information for guiding use of the identified utterance information.

16. The method of claim 15, further comprising:
providing the guide information for guiding use of the utterance information based on a user's selection history for response information provided based on the identified utterance information, or providing guide information for guiding the user to select utterance information of another user.

17. The method of claim 11, further comprising:
receiving information on the plurality of applications from an external device; and
based on a selection command for an application included in the guide information being selected, providing a control command for executing the selected application to the external device.

18. The method of claim 11, further comprising:
based on the user's utterance related to at least one of a plurality of applications being received, storing the user's utterance to the use history related to the at least one of the plurality of applications.

* * * * *